United States Patent [19]
Satoh et al.

[11] Patent Number: 5,222,106
[45] Date of Patent: Jun. 22, 1993

[54] INTERFERENCE DETECTION AND REDUCTION

[75] Inventors: Gunkichi Satoh, Yokohama; Toshinari Kimura; Takashi Inoue, both of Tokyo, all of Japan

[73] Assignee: Kokusai Denshin Denwa Kabushiki Kaisha, Tokyo, Japan

[21] Appl. No.: 566,679

[22] Filed: Aug. 13, 1990

[30] Foreign Application Priority Data

Feb. 7, 1990 [JP] Japan ................................. 2-26178
Feb. 7, 1990 [JP] Japan ................................. 2-26179
Feb. 7, 1990 [JP] Japan ................................. 2-26180

[51] Int. Cl.$^5$ ............................................. H04B 1/10
[52] U.S. Cl. ...................... 375/102; 375/103; 328/162; 328/167; 455/207; 455/209; 455/306; 455/340
[58] Field of Search ............ 375/102, 103; 328/162, 328/167; 455/206, 207, 208, 209, 210, 303, 306, 339, 340

[56] References Cited

U.S. PATENT DOCUMENTS

| | | | |
|---|---|---|---|
| 2,903,693 | 9/1959 | Ley ................................. | 455/78 |
| 3,092,776 | 6/1963 | Castellini ......................... | 455/296 |
| 3,783,397 | 1/1974 | Dishal et al. .................... | 375/103 |
| 4,475,214 | 10/1984 | Gutleber ......................... | 375/102 |
| 4,646,097 | 2/1987 | King ................................ | 375/102 |

Primary Examiner—Curtis Kuntz
Assistant Examiner—Young Tse
Attorney, Agent, or Firm—Emmanuel J. Lobato; Robert E. Burns

[57] ABSTRACT

Interference detection and reduction is disclosed in which an interference carrier is reduced by processing a signal of an input frequency to a demodulator such as a PSK signal appended with bit sequence for carrier recovery and bit timing recovery for use in the TDMA system, for example, a signal of the intermediate frequency (IF) band of a 140 MHz center frequency, so that the attenuation of a band-elimination filter is limited to a value smaller than a certain one, or for the frequency bands in which spectra are produced by the bit sequence, the IF signal is combined with the band-elimination filter output via a narrow band-pass filter to control the attenuation in each of these frequency bands to a value smaller than a certain one, thereby preventing the signal quality of the TDMA signal from being degraded by the insertion of the band-elimination filter. An interference detector of a multiplexer sweep system can be obtained by combining the functions of the phase-lock loop and the filter multiplexer so as to permit the estimation of the frequency of an interference carrier with a relatively simple structure.

11 Claims, 10 Drawing Sheets

INTERFERENCE DETECTION AND REDUCTION

BACKGROUND OF THE INVENTION

The present invention relates to an interference reducing device which detects and reduces unmodulated carriers, narrow-band FM carriers, or their sweep carriers which get mixed as interference carriers into the communication band in a TDMA (Time Division Multiple Access) digital satellite communication system.

With the development of satellite communication systems, the number of earth stations which access the same satellite is on the increase. Occasionally the situation arises where un-modulated carriers, narrow-band FM carriers, or their sweep carriers are emitted as unwanted carriers owing to a fault or operation mistake of earth station equipment. In the TDMA system each station transmits, every fixed period of time called a TDMA frame, a burst-like TDMA signal of a fixed carrier frequency within a certain time slot allotted to the station. To establish burst synchronization for high precision control of the burst transmission timing of respective stations to ensure that they send their bursts at different timing, a reference station sends a reference burst for each TDMA frame. The reference burst is used for system control as well as for maintaining the synchronization of the TDMA system. On the other hand, a traffic station for transmitting and receiving information sends a traffic burst. The application of the above-mentioned unwanted carriers as interference carriers to the TDMA system not only degrades the signal quality but also may sometimes hinder the system control by the reference burst and synchronization of the traffic burst, making communication impossible throughout the system.

In the time division multiple access system (the TDMA system) introduced in the digital satellite communication, each station transmits a burst-like TDMA signal of a fixed carrier frequency within a certain time slot allotted to the station. To establish burst synchronization for high precision control of the burst transmission timing of respective stations so that they send their bursts at different timing, a synchronization burst is inserted for each TDMA frame. The synchronization burst (a reference burst) sent from a reference station is employed for system control as well as for maintaining the synchronization of the TDMA system. An interference carrier, if mixed in such a communication system, will degrade the signal quality and, further, may sometimes destroy the burst synchronization and the system control by the reference burst, leading to a failure in communication.

For detecting an interference carrier mixed in the input signal band, there has been proposed a method which obtains the interference carrier frequency from the output frequency of a voltage-controlled oscillator which is synchronized with the narrow-band interference carrier by means of a phase lock loop, or a method in which the input signal band is divided by a filter multiplexer composed of a plurality of narrow band-pass filters of different center frequencies and a signal component in each divided band is detected, converted into a digital value and processed by a CPU for estimating the interference wave carrier frequency. The interference detector employing the phase lock loop is simple in circuit construction and permits easy detection and tracking of an unmodulated carrier or interference carrier which continuously sweeps in the received signal band, but in the case where the interference carrier mixed in the input signal is discontinuous or intermittent, synchronization of the phase lock loop cannot be maintained. Further, when the level of the interference carrier becomes low, the synchronized state of the phase lock loop becomes unstable, making it difficult to decide the presence or absence of the interference carrier. On the other hand, the filter multiplexer system is capable of detecting an interference carrier, even if it is discontinuous or intermittent, but in a case of detecting an interference carrier of power lower than that of the input signal, it is necessary to use a filter multiplexer of enhanced detecting sensitivity by dividing a desired transmission band with a number of narrow-band filters, a number of A/D converters for converting the detected outputs of the multiplexer into digital values and a CPU of high-speed operation. This inevitably makes the interference detector bulky and expensive.

SUMMARY OF THE INVENTION

An object of the present invention is to provide an interference reducing device which, based on the fact that the modulated carrier for use in the digital satellite communication system and the narrow-band interference carrier are, in general, markedly different from each other in power density, quickly detects the narrow-band interference carrier which suddenly gets mixed into the input signal band and, eliminates that one portion of the signal frequency band in which the interference carrier exists, through use of a band-rejection filter, thereby preventing degradation of the signal quality in the TDMA system owing to the interference carrier and precluding the possibility of system down.

Another object of the present invention is to provide an interference detector of a multiplexer sweep system which obviates the above-mentioned defects of the prior art by combining the functions of the phase lock loop and the filter multiplexer and permits the estimation of the frequency of an interference carrier with a relatively simple structure.

For rapid and accurate detection of the interference carrier frequency mixed in the input signal band, it is possible to employ a system which derives the interference carrier frequency from the output frequency of a voltage controlled oscillator (VCO) synchronized with the narrow-band interference carrier by means of a phase-lock loop, or a system which divides the input signal band by a filter multiplexer composed of a number of narrow band-pass filters of different center frequencies and estimates the interference carrier frequency by detecting a signal component in each divided band. The interference carrier frequency mixed in the input signal band is thus detected and a certain band in which the interference carrier exists is rejected by a band-elimination filter. In the TDMA system, however, since each station needs to perform, at high speed, a carrier regeneration and a bit timing regeneration for the demodulation of the received burst, the bursts which are transmitted from the reference station and the traffic stations are each headed by carrier and bit timing recovery sequence. These bit sequences are often composed of an unmodulated carrier and a periodic repetition pattern for high-speed synchronization, and their frequency spectra concentrate at a particular frequency. For example, in an INTELSAT TDMA system which utilizes a 120 Mbps four-phase phase-shift keying modulation (QPSK), the carrier and bit timing recovery sequence are each composed of an unmodulated wave and a repetition pattern of 0,π, 0,π, 0,π, . . . phase position and hence the frequency spectrum during the sending of the bit string centers on the center frequency f0 of the signal band and a frequency f0±30 MHz. Thus, if the spectra in particular frequency ranges by the bit sequence are rejected by the band-rejection filter, then the carrier recovery and the bit timing recovery cannot be achieved, and consequently, no normal demodulation is feasible. On the other hand, since randomly modulated frequency spectra are partly rejected outside these frequency ranges, the influence of removal of signal components by the band-elimination filter is slight. The amount of the narrow-band interference carrier reduced by the band-elimination filter in the TDMA system differs with the configurations of the bit sequence for carrier and bit timing recovery.

According to the present invention, when an interference carrier is reduced by processing a signal of an input frequency to a demodulator such as a PSK signal appended with bit sequence for carrier recovery and bit timing recovery for use in the TDMA system, for example, a signal of the intermediate frequency (IF) band of a 140 MHz center frequency, the attenuation of a band-elimination filter is limited to a value smaller than a certain one, or for the frequency bands in which spectra are produced by the bit sequence, the IF signal is combined with the band-elimination filter output via a narrow band-pass filter to control the attenuation in each of these frequency bands to a value smaller than a certain one, thereby preventing the signal quality of the TDMA signal from being degraded by the insertion of the band-elimination filter. When no interference wave is detected, the input IF signal is passed intact through the interference reducing device so that no deterioration of the signal quality will be introduced by the reducing device.

To attain the above second object, the interference detector of the present invention has such a construction as follows:

The interference detector comprises: a frequency converter employing a voltage-controlled oscillator as a local oscillator; a multiplexer employing a plurality of narrow band-pass filters of center frequencies set within the output frequency band of the frequency converter; a circuit for detecting and converting the output of the multiplexer into a digital voltage value; a CPU for processing the converted digital voltage value; a D/A converter for controlling the oscillation frequency of the voltage-controlled oscillator with the CPU output; and means responsive to a control signal from the CPU to sweep the oscillation frequency of the voltage-controlled oscillator, to apply a desired frequency-converted input signal band component to the multiplexer and to detect and convert its output into a digital voltage value for input into the CPU.

Based on the fact that a digital modulated signal and a narrow-band interference carrier mixed therein sharply differ from each other in power density, the interference detector of the present invention decides the presence or absence of the interference carrier, its frequency and the direction of its change by processing in the CPU and tracking the interference carrier frequency to obtain an oscillation frequency of the voltage-controlled oscillator which is equal to the interference carrier frequency.

The detecting speed is in proportion to the pass bandwidth of the multiplexer using a plurality of band-pass filters, but the tracking accuracy is in reverse proportion to the above-said pass bandwidth. By using a multiplexer of a large pass bandwidth to increase the detecting speed of the interference detector and by using a multiplexer of a relatively small bandwidth to enhance the tracking accuracy of an interference tracking circuit, it is possible to drive the voltage-controlled oscillator at a frequency following the interference carrier frequency.

BRIEF DESCRIPTION OF THE DRAWINGS

The present invention will be described in detail below with reference to the accompanying drawings, in which.

DETAILED DESCRIPTION

Figure 1:
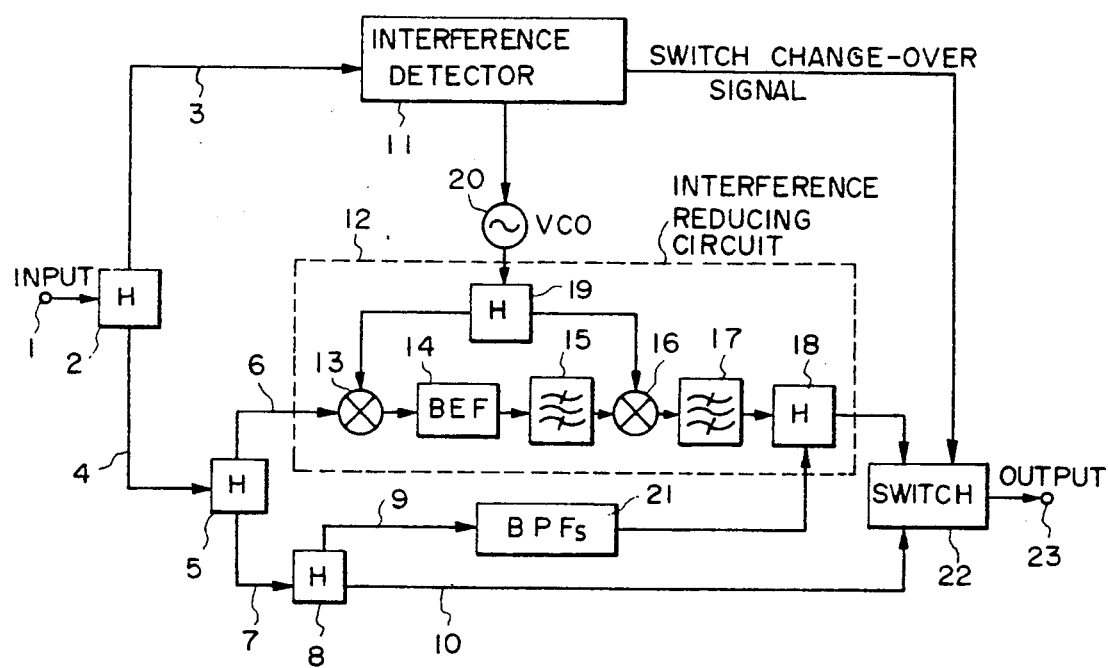
FIG. 1 is a block diagram illustrating an embodiment of the interference reducing device of the present invention.

With reference to FIG. 1, a first embodiment of the interference reducing device according to the present invention will first be described. An IF signal applied to an input terminal 1 is branched by hybrid circuits (H) 2 and 5 and provided on first, second, third and fourth lines 3, 4, 6 and 7. The IF signal on the first line 3 is applied to an interference detector 11 for detecting the presence or absence of an interference carrier and its frequency. The IF signal on the third line 6 is applied to an interference reducing circuit 12, in which, when an interference wave is detected, the signal frequency band where its frequency exists is reduced by a band-elimination filter (BEF) 14. The fourth line 7 is further branched by a hybrid circuit 8 into fifth and sixth lines 9 and 10. The output of the fifth line 9 is applied to a hybrid circuit 18 via a plurality of narrow band-pass filters 21 each of which uses, as its center frequency, a particular frequency at which spectra are produced by the afore-mentioned bit sequence in the IF band. In the hybrid circuit 18 the output of the fifth line 9 is combined with the output of the third line 6 provided with the BEF 14. The sixth line 10 is a bypass transmission line of the IF signal in the normal state where no interference is present, and this bypass is connected via a switch 22 to an output terminal 23.

The interference reducing circuit 12 comprises a first mixer (MIX) 13, the narrow BEF 14 for interference wave reduction use, a second mixer 16, a hybrid circuit 19 for branching the output of a local oscillator (VCO) 20 for application to the first and second mixers 13, 16, and bandpass filters (BPF) 15 and 17 which reduce an image frequency component resulting from a frequency conversion and pass therethrough only desired signal band components. In the interference wave reducing circuit 12 the IF signal and the output of the voltage controlled oscillator (VCO) 20 used as a local oscillator are provided to the mixer 13 to obtain a signal component of their sum (or difference) frequency, which is applied via the BEF 14 and the BPF 15 to the MIX 16 for conversion into a frequency of the difference (or sum) between it and the output frequency of the VCO 20, i.e. an IF signal. If the center frequency of the BEF 14 is selected within the output frequency band of the MIX 13, then the section between the input of the MIX 13 and the output of the MIX 16 can be used as a frequency variable narrow band-elimination filter by changing the oscillation frequency of the VCO 20.

When an interference carrier gets mixed into the IF signal applied to the input terminal 1 of this device, it is detected by the interference detector 11, which obtains its center frequency and then yields a VCO control signal and a switch change-over signal. The VCO control signal controls the oscillation frequency of the VCO 20 so that the band-elimination frequency of the interference reducing circuit 12 coincides with the frequency of the interference carrier. Accordingly, the IF signal provided on the third line 6 is reduced by the BEF 14 of the interference reducing circuit 12 in the frequency band in which the signal component is included and the interference carrier is present. To permit demodulation of the TDMA signal even in a case where the particular frequency band in which spectra are produced by the bit sequence appended to the burst signal is reduced by the band-elimination filter, it is necessary to limit the attenuation of the filter. However, this lessens the interference reducing effect. To heighten the interference reducing effect by removing the above-mentioned particular frequency band, the plurality of narrow BPFs 21, each using as its center frequency the particular frequency dependent on the configuration of the bit sequence, are connected to the fifth line 9, the outputs of the BPFs 21 are combined with the output of the interference reducing circuit 12 by the hybrid circuit 18, and the attenuation of each BPF 21 is adjusted. The attenuation of these frequency bands can thus be controlled. Incidentally, the interference detector 11 changes over the switch 22 in accordance with the detection or nondetection of the interference and connects the interference band reducing output or the output of the sixth line 10 as the bypass transmission line to the output terminal 23.

Figure 2:
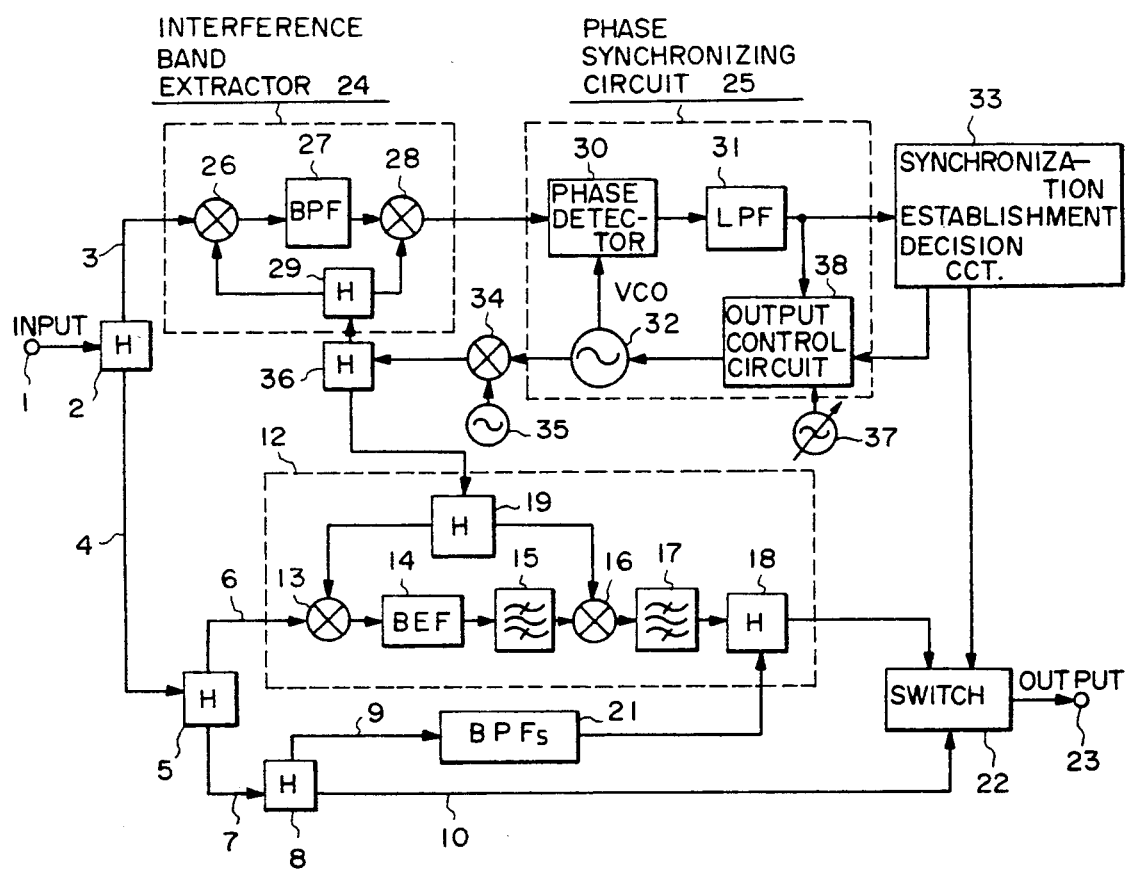
FIGS. 2 and 3 are block diagram illustrating specific operative examples of an interference detector for use in the device depicted in FIG. 1.

FIG. 2 illustrates a second embodiment of the present invention. This embodiment employs a phase lock loop as the interference detector but the interference reducing circuit and the switch are exactly identical in construction to those in FIG. 1; so that the following description will be given mainly of the construction and the operation of the interference detector.

The interference detector in this embodiment is divided into an interference band extractor 24 which is composed of a third MIX 26, a fourth MIX 28, a BPF 27 interposed between them and a hybrid circuit 29 for branching a local oscillation signal, and a phase synchronizing circuit (phase-lock loop) 25. The interference band extractor 24 has the same construction as the interference reducing circuit 12 in the first embodiment and functions as a frequency variable type BPF by varying the frequency of a local oscillator. The pass-band width of the BPF 27 in the interference band extractor 24 is set to about 10% of a desired signal band width so as to facilitate the interference pull-in operation of the phase-lock loop 25 which raises the interference carrier power vs. signal power ratio when an interference carrier gets mixed. The local oscillation signal to the third and fourth MIXs 26 and 28 is the output of a VCO 32 of the phase-lock loop 25 which is applied thereto via hybrid circuits 36 and 29 after being frequency converted by a local oscillator 35 and a MIX 34.

The phase synchronizing circuit (phase-lock loop) 25 is basically formed by a phase detector 30, a low-pass filter (LPF) 31 and the VCO 32. In the normal state in which no interference is present, that is, when no phase synchronization is established, the oscillation frequency of the VCO 32 is controlled by the output voltage of a sweep oscillator 37 and sweeps in the transmission band of a desired signal. The output of the VCO 32 is used also as the local oscillation signal source of the interference band extractor 24. While no interference wave is detected, the transmission band of the desired signal is swept by the interference band extractor 24 and the output having extracted a portion of the signal band is applied to the phase-lock loop 25 to hunt for the interference.

On the other hand, when the phase-lock loop 25 is synchronized with the interference carrier, a synchronization establishment decision circuit 33 provides a control signal to an output control circuit 38 of the sweep oscillator 37, controlling the VCO 32 by the output voltage of the LPF 31 alone. Accordingly, the phase-lock loop 25 forms an ordinary phase locked loop which receives an interference carrier as its input signal and provides the output frequency of the VCO 32 synchronized with the interference carrier. The synchronization establishment decision circuit 33 decides whether or not the phase-lock loop 25 is synchronized with the interference carrier, and determines the detection or non-detection of the interference carrier. Upon detection of the interference carrier, the synchronizaiton establishment decision circuit 33 changes over the switch 22, through which the output of the interference reducing circuit 12 is applied to the output terminal 23. As is the case with the interference band extractor 24, the local oscillation frequency of the interference reducing circuit 12 is provided by frequency converting the oscillation frequency of the VCO 32 with the local oscillator 35 and the MIX 34 and then branching the converted output with a hybrid circuit 36.

Figure 3:
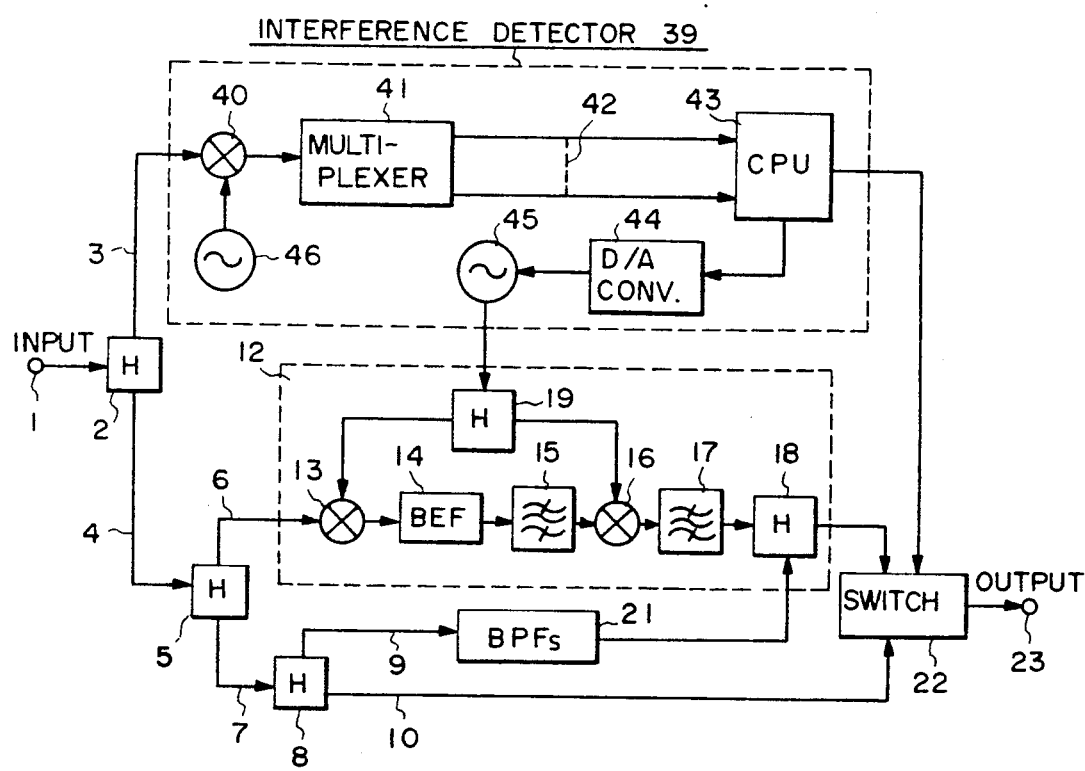
Figure 11:
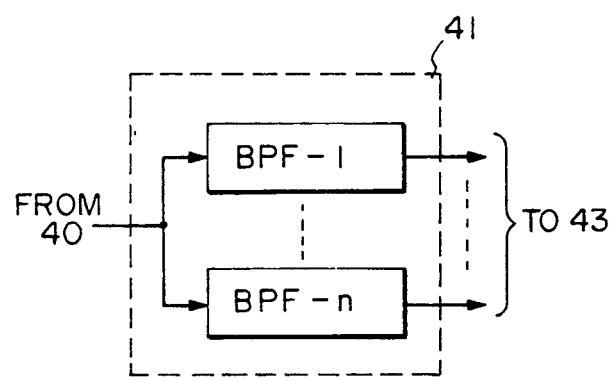
FIG. 11 is a diagram of multiplexers in the embodiment of the invention in FIG. 3.

FIG. 3 illustrates a third embodiment of the present invention. In this embodiment the interference detector employs a multiplexer composed of a plurality of narrow-band BPFs of different center frequencies, as shown in FIG. 11, and has a circuit arrangement in which the outputs of bands divided by the multiplexer are detected and converted into digital voltage values, which are processed by a CPU so as to detect an interference carrier and determine its frequency. Since the interference reducing circuit is identical in construction with those shown in FIGS. 1 and 2, a description will be given only of the interference detector using the multiplexer.

The IF signal applied to the input terminal 1 is applied via the hybrid circuit 2 to an interference detector 39. The IF signal fed to the interference detector 39 is converted by a local oscillator 46 and a MIX 40 into a signal of the operating frequency band of a multiplexer 41, thereafter being applied thereto for division into individual bands. The output terminal of each of a plurality of narrow band-pass BPFs forming the multiplexer 41 is connected to a detector and an A/D converter, and a digital voltage value A/D converted from an analog detected voltage of each band is stored into a memory of a CPU 43. The CPU 43 determines the presence or absence of an interference carrier in each band by digital processing following a predetermined algorithm based on a detected voltage value in the absence of an interference carrier. While in FIG. 3 only one CPU is shown to be used, it is also possible to perform parallel processing for respective bands through use of a plurality of CPUs for high-speed operation. In a case where it is determined by such digital processing that an interference carrier is present in a certain frequency band, information about the center frequency of the interference carrier is sent via D/A converter 44 from the CPU 43 to a VOC 45, from which a continuous wave corresponding to the center frequency of the interference carrier is provided to the interference reducing circuit 12. In the interference reducing circuit 12 the BEF 14 reduces the frequency band in which there exists the interference carrier containing the signal component of the IF signal applied to the interference reducing circuit 12 via the input terminal 1 and the hybrid circuit 2 and 5. Further, the CPU 43 applies a switch change-over signal to the switch 22, providing therethrough the output of the interference reducing circuit 12 to the output terminal 23. Where it is determined that no interference carrier exists, the CPU 43 controls the switch 22 so that the IF signal transmitted over the bypass transmission line 10 is provided intact to the output terminal 23.

With the above-described operation, when it is determined that an interference carrier is present in the IF input signal, a signal with the interference band reduced is output, whereas when it is determined that no interference carrier exists, the IF input signal is output intact. According to the present invention, it is possible to implement an interference reducing device which is characterized in that the attenuation of a band-elimination filter for reducing an interference carrier is limited to a value smaller than a certain one, or for frequency bands in which spectra are produced by bit sequence for burst signal demodulating use, the IF signal is combined with the band-elimination filter output via a narrow band-pass filter to limit the attenuation in these frequency bands to a value smaller than a certain one, thereby preventing the TDMA signal quality from being degraded by the insertion of the band-elimination filter in a particular frequency band. Incidentally, when no interference is detected, the IF input signal is passed intact through the interference reducing device; so that no deterioration of the signal quality is caused by the interference reducing device.

Figure 4:
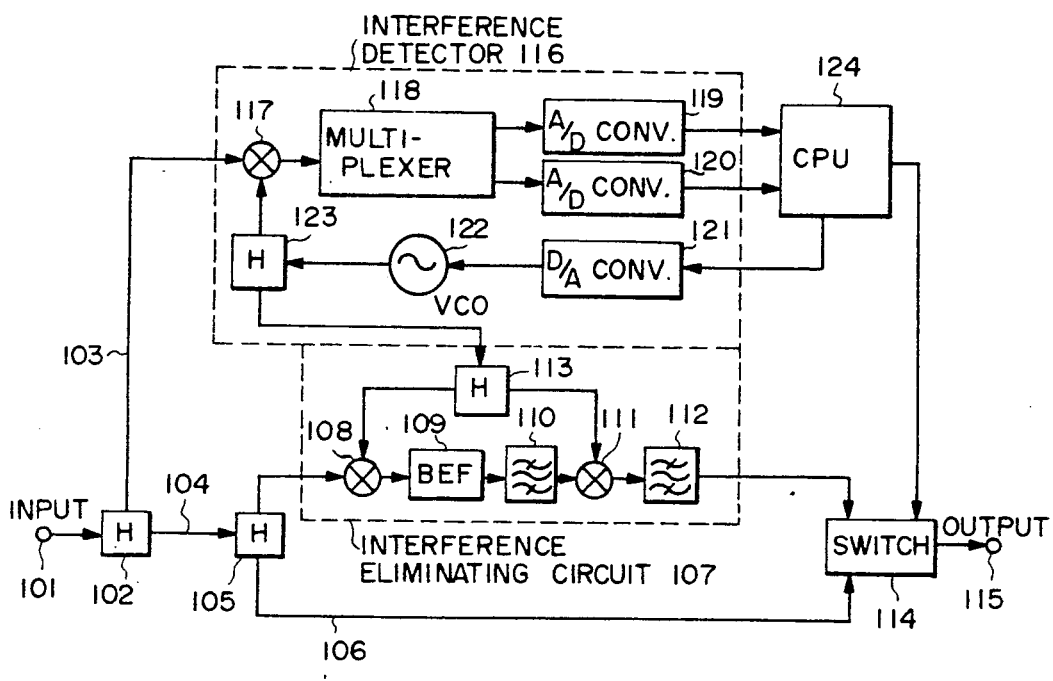
FIGS. 4 and 6 are block diagrams illustrating embodiments of the interference detector of the present invention.

FIG. 4 illustrates a fourth embodiment of an interference wave eliminating circuit employing the interference detector of the present invention. An IF signal applied to an input terminal 101 is branched by a hybrid circuit 102 and provided to first and second lines 103 and 104. The IF signal on the first line 103 is applied to an interference detector 116, wherein it is used for detecting the presence or absence of an interference carrier and its frequency. The IF signal on the second line is branched by a hybrid circuit 105 into two, one of which is applied to an interference eliminating circuit 107 and the other of which is applied to an IF line 106. Upon detection of an interference, the signal frequency band in which the interference carrier frequency exists is eliminated by a band elimination filter (BEF) 109. The IF line 106 is a bypass transmission line for a normal IF signal containing no interference and is connected via a switch 114 to an output terminal 115.

The interference eliminating circuit 107 is made up of a first mixer (MIX) 108, a band-elimination filter (BEF) 109 for eliminating a narrow-band interference carrier, a second mixer 111, a hybrid circuit 113 for branching a local oscillator signal for input into the first and second mixers, and band-pass filters (BPF) 110 and 112 each of which eliminates an image frequency components resulting from frequency conversion and permits the passage therethrough of only a desired signal band component. The interference elimination circuit 107 functions as a frequency-variable narrow-band elimination filter by changing the frequency of a voltage-controlled oscillator (VCO) 122 which is used as a local oscillator for each of the first and second mixers. An interference carrier mixed in the IF signal provided to the input terminal 101 is detected by the interference detector 116, and a VCO control signal and a switch changeover signal are yielded in search for the center frequency of the detected interference. Consequently, the IF signal provided to the interference eliminating circuit 107 is eliminated by the band-elimination filter 109 in the frequency band in which the interference exists. Upon detection of the interference eliminating circuit 107 changes over the switch 114 and provided therethrough at the output terminal 115 the IF signal having removed therefrom the interference band.

The interference detector 116 in this embodiment comprises a third mixer 117, a multiplexer 118 employing two narrow-band filters of different center frequencies, A/D converters 119 and 120 for detecting the outputs of respective bands divided by the multiplexer 118 and converting them into digital voltage values, a CPU 124 for processing the digital values, a D/A converter 121 for controlling the oscillation frequency of the VCO 122 with the CPU output, the VCO 122, and a hybrid circuit 123 for branching the VCO output.

The IF signal applied to the interference detector 116 is converted by the VCO 122 and the mixer 117 into the operating frequency band of the multiplexer 118 and is then applied to the multiplexer 118, wherein its band is divided into plural parts. Each of the two narrow-band filters forming the multiplexer 118 is connected at its output terminal to a detector and the A/D converter, and a digital version of the analog detected voltage of each divided band is loaded into a memory of the CPU 124. The CPU 124 sweeps the VCO 122 and performs digital processing following an algorithm determined on the basis of a voltage value detected in the absence of an interference in the desired signal band, thereby deciding the presence or absence of an interference wave in each band being swept. Where it is determined by such digital processing that an interference is present in a certain frequency band, the sweep of the VCO 122 is stopped and the output levels of the multiplexer 118 are compared with one another in terms of magnitude to tracking the interference.

Next, a detailed description will be given of the detection tracking operation of the interference detector employing the multiplexer 118 formed by two narrow band-pass filters.

Figure 5:
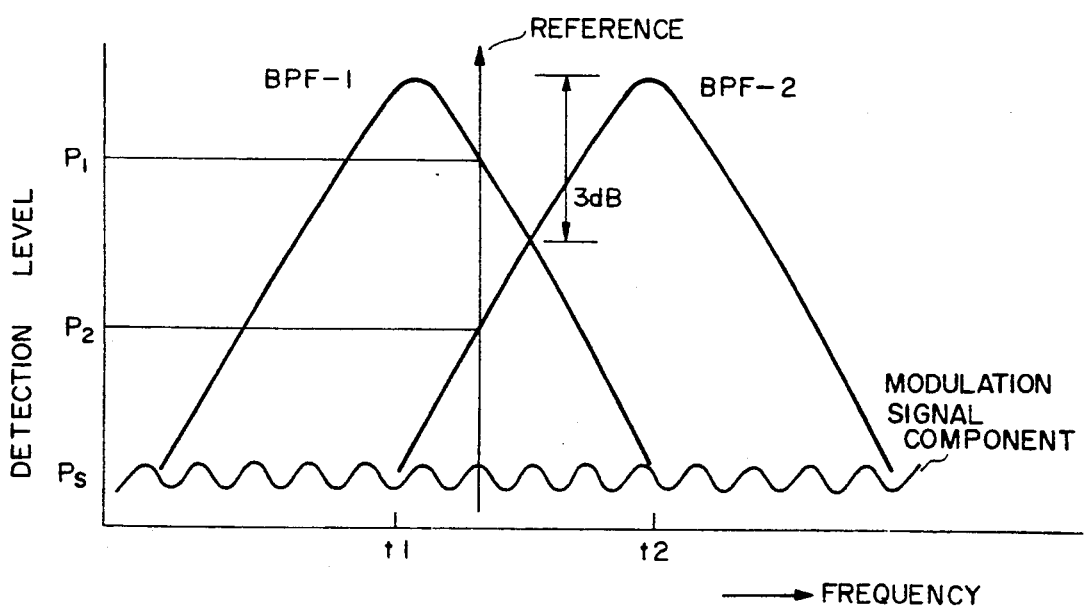
FIG. 5 is a graph explanatory of the operation of the present invention device.

FIG. 5 shows frequency vs. detected level relationships obtained when a signal component containing an interference was detected by a multiplexer having an arrangement in which narrow-band filters BPF-1 and BPF-2 of center frequencies f1 and f2 were disposed so that they would cross each other at a point of a 3 dB passage loss. By selecting the pass bandwidths of filters BPF-1 and BPF-2 sufficiently small as compared with the signal band, the difference between a detected level PS of a signal component of varying power density and a detected level P1 or P2 in the presence of an interference increases, making it possible to detect the interference with high sensitivity. Thus, by sweeping the VCO and comparing the detected level of the multiplexer 118 in the band of the signal frequency-converted by the mixer 117 with the detected level obtained in the absence of the interference, or by setting a threshold value at a point higher than the detected level of the signal component, it is possible to decide the presence or absence of the interference and estimate its frequency from the sweep frequency of the VCO. Further, as regards the tracking of the interference carrier frequency when it varies, the direction of its change can be decided by comparing the detected levels of the filters BPF-1 and BPF-2 with each other in terms of magnitude. The accuracy of estimation of the interference carrier frequency could be increased by forming the multiplexer with more than two band-pass filters.

Figure 6:
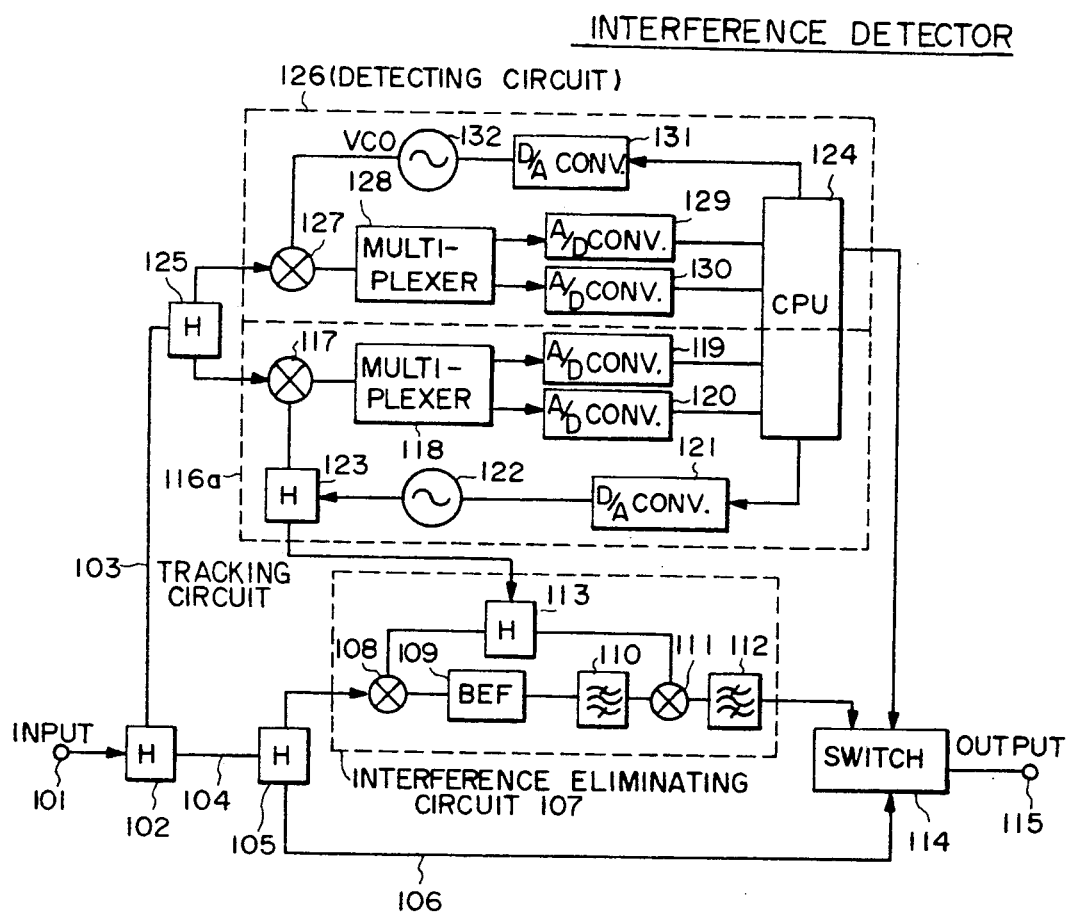

FIG. 6 illustrates a fifth embodiment of the present invention. In a case of detecting and tracking an interface carrier by sweeping the filter multiplexer 118 of the interference detector 116 in the first embodiment of the invention, the interference wave detecting sensitivity is high when the pass bandwidth of the multiplexer is small, but in this instance, the speed for sweeping the signal band is limited. On the other hand, an increase in the pass bandwidth of the multiplexer 118 will raise the sweep speed but will lower the accuracy of estimation of the interference carrier frequency as well as the detecting sensitivity. This embodiment is adapted to solve these shortcomings by forming the interference detector with circuits which possess the detecting function and the tracking function, respectively. In this embodiment the input signal line to the interference detector is branched into two, both of which are connected circuits which are of the same construction as that of the interference detector 116 used in the first embodiment and are operated as a tracking circuit 116a and a detecting circuit 26, respectively. Multiplexers used in the tracking circuit 116a and the detecting circuit 126 have different pass bandwidths. The multiplexer employing a band-pass filter of a large bandwidth is used to detect the interference wave which the multiplexer employing a band-pass filter of a small bandwidth is used to tracking the interference carrier, thereby speeding up the detection of the interference and permitting highly accurate tracking of its carrier frequency.

Now, a description will be given, with reference to FIG. 6, of the construction and operation of the fifth embodiment of the invention.

The detecting circuit in this embodiment comprises a mixer 127, a multiplexer 128 employing a plurality of narrow band-pass filters, A/D converters 129 and 130 for detecting the outputs of bands divided by the multiplexer 128 and converting them into digital voltage values, a CPU 124 for processing these digital values, a D/A converter 131 for controlling the oscillation frequency of a VCO 132 with the output of the CPU 124, and the VCO 132.

The IF signal applied to the input signal terminal 101 is branched by the hybrid circuits 102 and 105, from which the branched parts are applied to the interference eliminating circuit 107, the IF line 106 and the interference detector is branched by a hybrid circuit 125, from which the branched parts are provided to the interference detecting circuit 126 and the tracking circuit 116a. The IF signal fed to the detecting circuit 126 is converted into the operating frequency band of the multiplexer 128 by means of the VCO 132 and the mixer 127, thereafter being applied to the multiplexer 128.

A digital voltage value converted from an analog voltage value which is the detected output of the multiplexer 128 is loaded into a memory of the CPU 124. The CPU 124 sweeps the VCO 132 and performs digital processing following an algorithm determined on the basis of a voltage value detected in the absence of an interference carrier in the desired signal band, thereby deciding the presence or absence of an interference carrier in each band being swept. In a case where it is determined by such digital processing that an interference carrier is present in a certain frequency band, the sweep of the VCO 132 is stopped and the output levels of the multiplexer 128 are compared with each other in terms of magnitude to obtain the center frequency of the interference carrier so that the oscillation frequency of the VCO 132 of the tracking circuit 116a is controlled via the CPU 124 accordingly. The tracking circuit 116a is identical in construction with the interference detector 116 in the embodiment shown in FIG. 4, and the frequency of the VCO 122 is set by control of the CPU 124 based on information of the detecting circuit 124. In a case where the interference carrier frequency is varying, the output of the VCO 122 which tracks the varying frequency is output to the interference eliminating circuit 107. Moreover, the CPU 124 sends a switch change-over signal to the switch 114, through which the IF signal applied to the interference eliminating circuit 107 is provided to the output terminal 115. When it is determined that no interference is present, the CPU 124 allows the IF signal on the IF line 106 to be provided intact to the output terminal 115.

Figure 10:
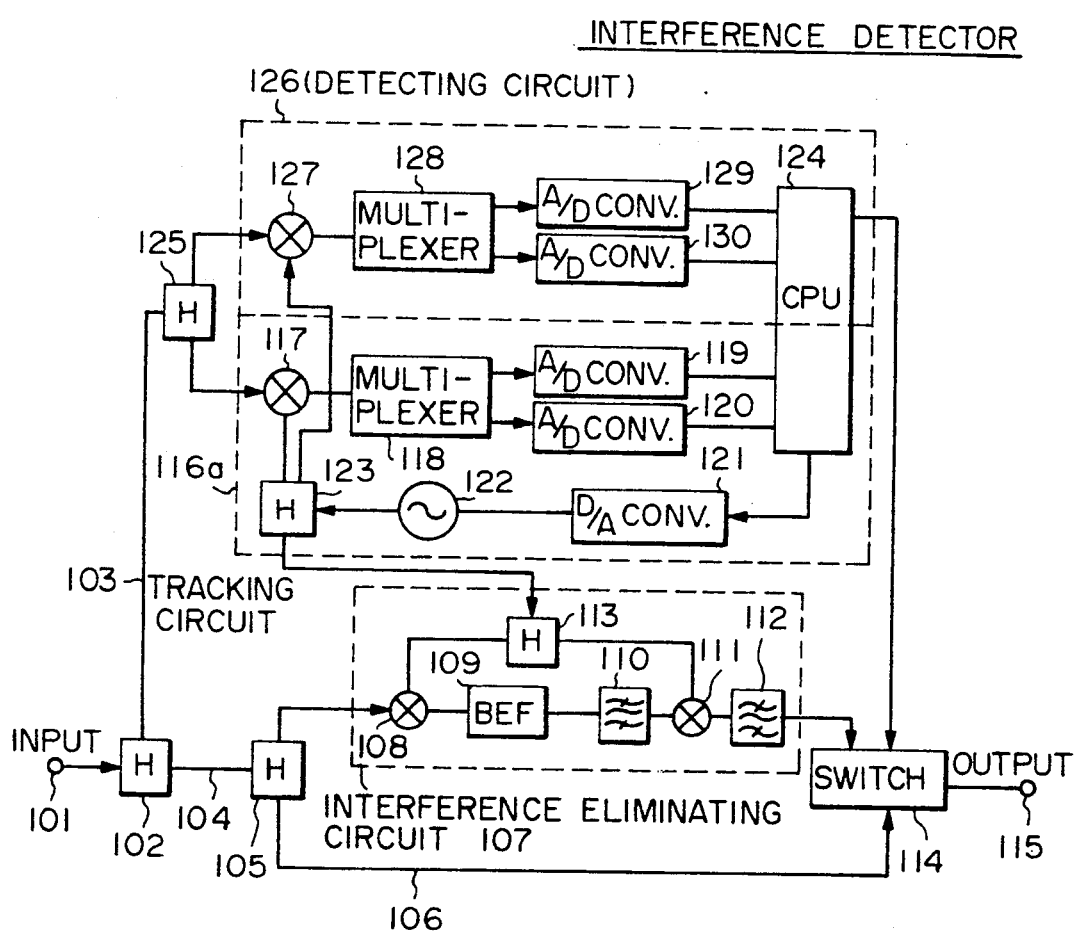
FIG. 10 illustrates a modification of the interference detector of FIG. 6.

It is also possible, as shown in FIG. 10, to omit the D/A converter 131 and the VCO 132 in the detecting circuit 126 by branching the output of the VCO 122 of the tracking circuit 116a for input into the mixer 127 and by modifying the control sequence of the CPU 124 which accompanies the interference detecting and tracking operations.

Figure 7:
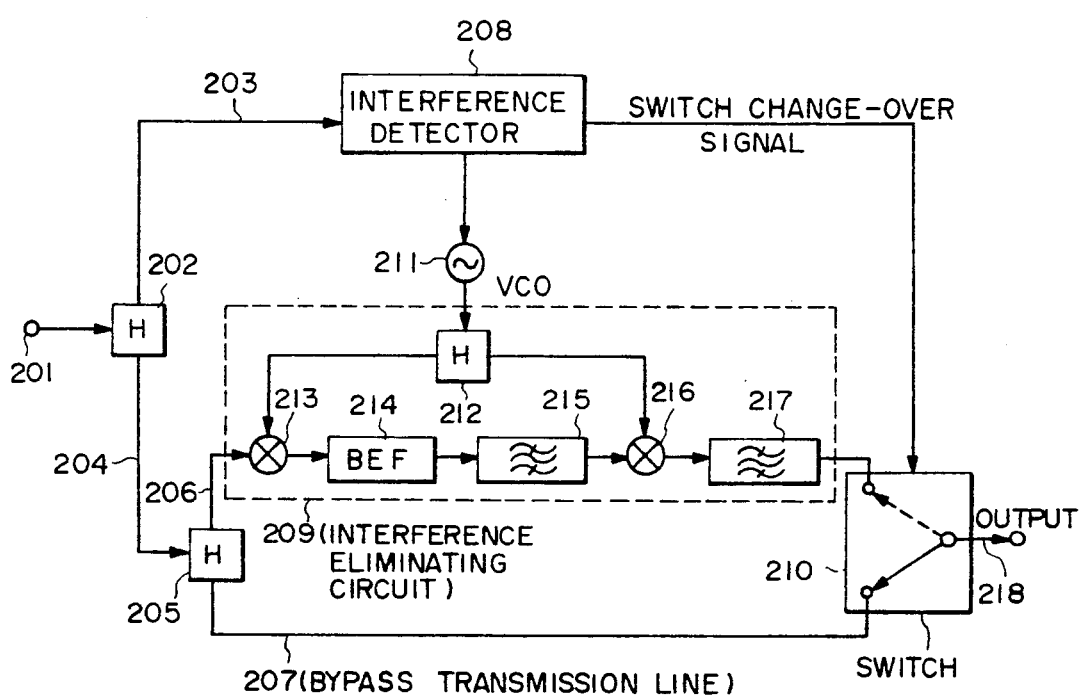
FIG. 7 is a block diagram illustrating an embodiment of the interference eliminating device of the present invention.

FIG. 7 illustrates a sixth embodiment of the interference eliminating device according to the present invention. An IF signal applied to an input terminal 201 is branched by hybrid circuits 202 and 205 and provided on first, second, third and fourth lines 203, 204, 206 and 207. The IF signal on the first line 203 is applied to an interference detector 208 for detecting the presence or absence of an interference carrier and its frequency. The IF signal on the third line 206 is applied to an interference eliminating circuit 209, in which, when an interference carrier is detected, the signal frequency band where its frequency exists is eliminated by a band-elimination filter (BEF) 214. The fourth line 207 is a bypass transmission line of the IF signal in the normal state where no interference carrier is present, and this bypass is connected via a switch 210 to an output terminal 218.

The interference eliminating circuit 209 comprises a first mixer (MIX) 213, a BEF 214 for narrow-band interference elimination use, a second mixer 216, a hybrid circuit 212 for branching a VCO output signal for application to the first and second mixers, and band-pass filters (BPF) 215 and 217 which eliminate an image frequency component resulting from a frequency conversion and pass therethrough only desired signal components. In the interference eliminating circuit 209 the IF signal and the output of a VCO 211 used as a local oscillator are provided to the mixer 213 to obtain a signal component of their sum (or difference) frequency, which is applied via the BEF 214 and the BPF 215 to the MIX 216 for conversion into a frequency of the difference (or sum) between it and the output frequency of the VCO 211, i.e. an IF signal. If the center frequency of the BEF 214 is selected within the output frequency band of the MIX 213, then the section between the input of the MIX 213 and the output of the MIX 216 can be used as a frequency variable narrow band-elimination filter by changing the oscillation frequency of the VCO 211.

When an interference gets mixed into the IF signal applied to the input terminal 201 of this device, it is detected by the interference detector 208, which obtains its center frequency and then yields a VCO control signal and a switch change-over signal. The VCO control signal controls the oscillation frequency of the VCO 211 so that the band-elimination frequency of the interference eliminating circuit 209 coincides with the frequency of the interference carrier. Accordingly, the IF signal provided on the third line 206 is eliminated by the BEF 214 of the interference eliminating circuit 209 in the frequency band in which the signal component is included and the interference carrier is present. The switch 210 is changed over by the switch change-over signal, through which the IF signal having eliminated therefrom the interference band is provided to the output terminal 218. After this, the interference detector 208 keeps on tracking the interference wave and continues to control the oscillation frequency of the VCO 211. When the interference carrier is no longer detected, the interference detector 208 changes over the switch 210, through which the output of the fourth line as the bypass transmission line is connected to the output terminal 218.

Figure 8:
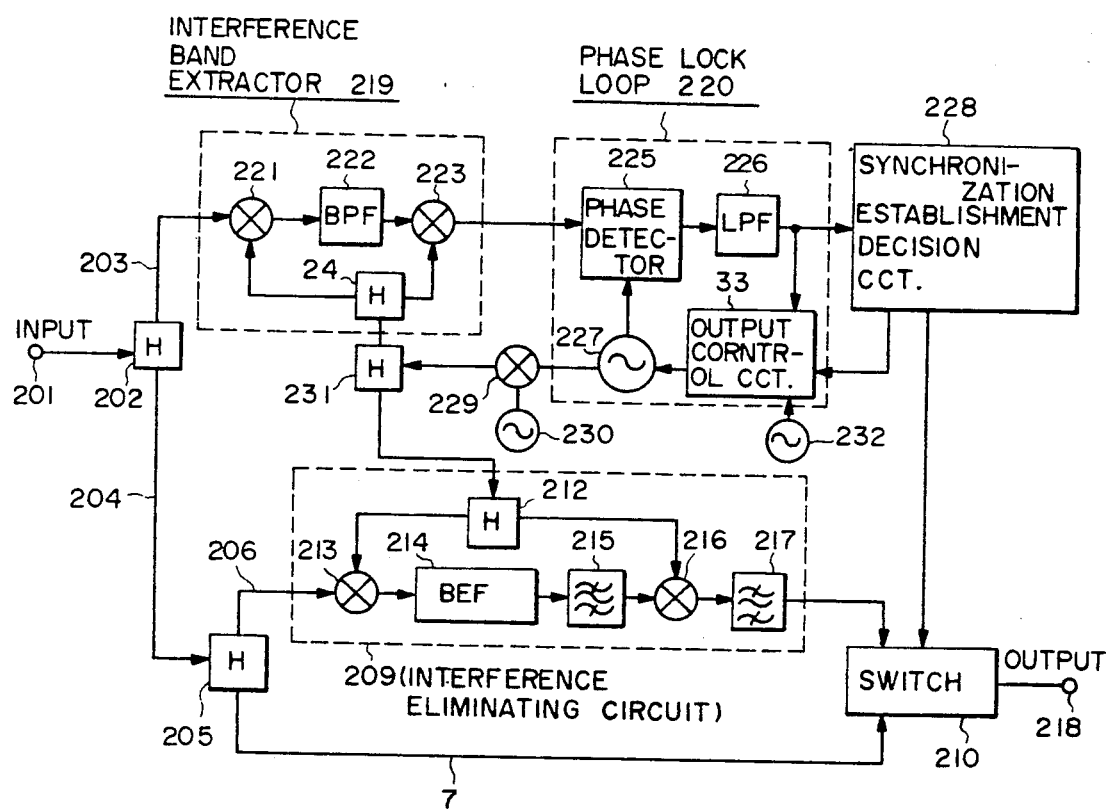
FIGS. 8 and 9 are block diagrams illustrating specific operative examples of an interference detector for use in the device of FIG. 7.

FIG. 8 illustrates a seventh embodiment of the present invention. This embodiment employs a phase-lock loop as the interference detector but the interference wave eliminating circuit 209 and the switch 210 are exactly identical in construction to those in FIG. 7; so that the following description will be given mainly of the construction and the operation of the interference detector.

The interference detector in this embodiment is divided into an interference band extractor 219 which is composed of a third MIX 221, a fourth MIX 223, a BPF 222 interposed between them and a hybrid circuit 224 for branching a local oscillation signal to plural parts, and a phase synchronizing circuit (phase-lock loop) 220. The interference band extractor 219 has the same construction as the interference eliminating circuit 209 in the first embodiment and functions as a frequency variable type BPF by varying the frequency of a local oscillator. The pass band width of the BPF 222 in the interference band extractor 219 is set to about 10% of a desired signal band width so as to facilitate the interference pull-in operation of the phase-lock loop 220 which raises the interference carrier power vs. signal power ratio when an interference carrier gets mixed. The local oscillation signal to the third and fourth MIXs 221 and 223 is the output of a VCO 227 of the phase-lock loop 220 which is applied thereto via hybrid circuits 231 and 224 after being frequency converted by a local oscillator 230 and a MIX 229.

The phase synchronizing circuit (phase-lock loop) 220 is basically formed by a phase detector 225, a low-pass filter (LPF) 226 and the VCO 227. In the normal state in which no interference carrier is present, that is, when no phase synchronization is established, the oscillation frequency of the VCO 227 is controlled by the output voltage of a sweep oscillator 232 and sweeps in the transmission band of a desired signal. The output of the VCO 227 is used also as the local oscillation signal source of the interference band extractor 219. While no interference wave is detected, the transmission band of the desired signal is swept by the interference band extractor 219 and the output having extracted a portion of the signal band is applied to the phase-lock loop 220 to hunt for the interference.

On the other hand, when the phase-lock loop 220 is synchronized with the interference carrier, a synchronization establishment decision circuit 228 provides a control signal to an output control circuit 223 of the sweep oscillator 232, controlling the VCO 227 by the output voltage of the LPF 226 alone. Accordingly, the phase-lock loop 220 forms an ordinary phase-lock loop which receives an interference carrier as its input signal and provides the output frequency of the VCO 227 synchronized with the interference carrier. The synchronization establishment decision circuit 228 decides whether or not the phase-lock loop 220 is synchronized with the interference carrier, and determines the detection or non-detection of the interference carrier. Upon detection of the interference carrier, the synchronization establishment decision circuit 228 changes over the switch 210, through which the output of the interference eliminating circuit 209 is applied to the output terminal 218. As is the case with the interference band extractor 219, the local oscillator input of the interference eliminating circuit 209 is provided by frequency converting the oscillation frequency of the VCO 227 with the local oscillator 230 and the MIX 229 and then branching the converted output with a hybrid circuit 231.

Figure 9:
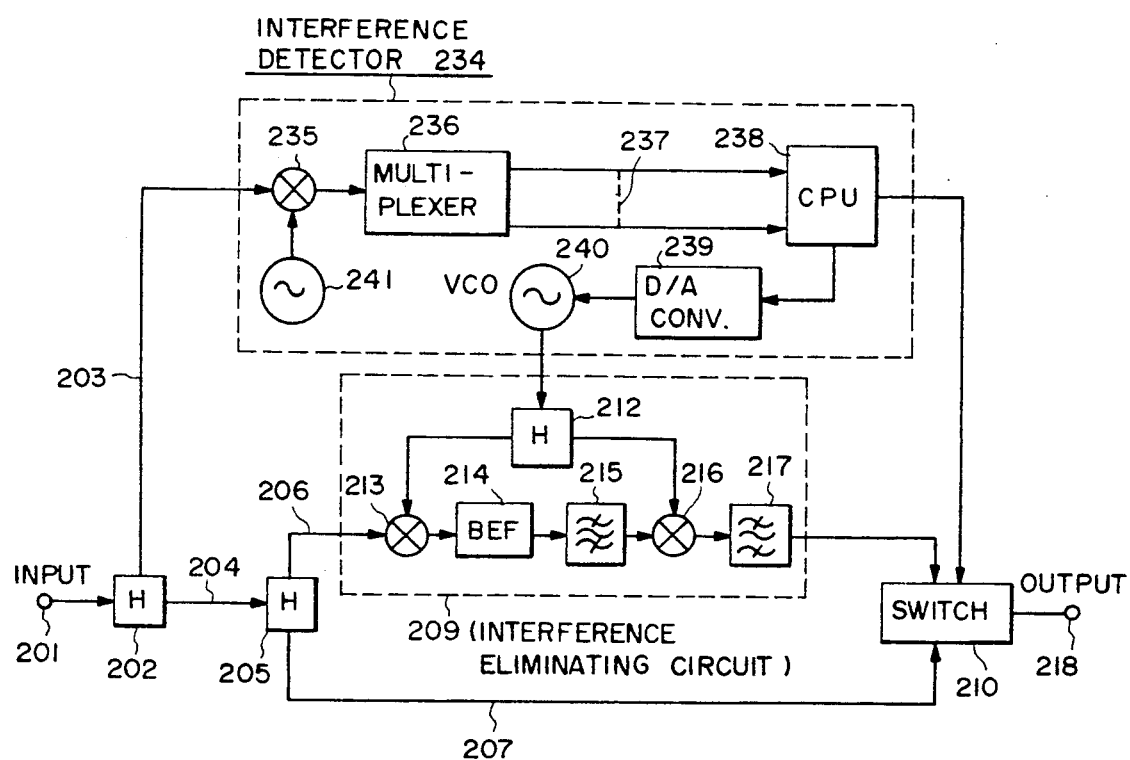

FIG. 9 illustrates a eighth embodiment of the present invention. In this embodiment the interference detector employs a multiplexer composed of a plurality of narrow-band BPFs of different center frequencies and has a circuit arrangement in which the outputs of bands divided by the multiplexer are detected and converted into digital voltage values, which are processed by a CPU so as to detect an interference carrier and determine its frequency. Since the interference eliminating circuit and the switch are identical in construction with those shown in FIGS. 7 and 8, a description will be given only of the interference detector using the multiplexer.

The IF signal applied to the input terminal 201 is applied via the hybrid circuit 202 to an interference detector 234. The IF signal fed to the interference detector 234 is converted by a local oscillator 241 and a MIX 235 into a signal of the operating frequency band of a multiplexer 241, thereafter being applied thereto for division into individual bands. The output terminal of each of a plurality of narrow band-pass BPFs forming the multiplexer 236 is connected to a detector and an A/D converter, and a digital voltage value A/D converted from an analog detected voltage of each band is stored into a memory of a CPU 238 via a multiplexer output line 237. The CPU 238 determines the presence or absence of an interference carrier in each band by digital processing following a predetermined algorithm based on a detected voltage value in the absence of an interference carrier. While in FIG. 9 only one CPU is shown to be used, it is also possible to perform parallel processing for respective bands through use of a plurality of CPUs for high-speed operation. Where it is determined by such digital processing that an interference carrier is present in a certain frequency band, information about the center frequency of the interference carrier is sent via D/A converter 239 from the CPU 238 to a VCO 240, from which a continuous wave corresponding to the center frequency of the interference wave is provided to the interference eliminating circuit 209. In the interference eliminating circuit 209 the BEF 214 eliminates the frequency band in which there exists the interference carrier containing the signal component of the IF signal applied to the interference eliminating circuit 209 via the input terminal 201 and the hybrid circuits 2 and 5. Further, the CPU 238 applies a switch change-over signal 219 to the switch 210, providing therethrough the output of the interference eliminating circuit 209 to the output terminal 218. Where it is determined that no interference carrier exists, the CPU 238 controls the switch 210 so that the IF signal transmitted over the bypass transmission line 207 is provided intact to the output terminal 218.

With the above-described operation, when it is determined that an interference carrier is present in the IF input signal, a signal with the interference band eliminated therefrom is output, whereas when it is determined that no interference carrier is present, the IF input signal is output intact; so that no degradation is caused by the interference eliminating device.

The interference eliminating device of the present invention employs a method which eliminates an interference carrier by processing the frequency of an input digital signal to a PSK demodulator or the like, for example, an intermediate-frequency (IF) input signal of a center frequency 140 MHz to the demodulator, and this invention device does not call for modification of the existing equipment. Further, according to the present invention, since the interference carrier is eliminated following the interference band, even in the case where the frequency of the interference carrier is varying, it is possible to automatically tracking the frequency to eliminate the interference carrier which appears in an arbitrary frequency band of a desired signal band.

As described above in detail, the interference reducing device of the present invention affords reduction of a narrow-band, high-power-density interference carrier which suddenly gets mixed into the satellite circuit, and hence prevents degradation of the circuit quality of the digital satellite communication system, in particular, prevents system down by the interference in the TDMA system.

It is possible with the interference detector of the present invention to quickly detect a narrow-band interference carrier which suddenly gets mixed into a satellite circuit and to obtain an output frequency of a voltage-controlled oscillator which follows up the interference wave with high accuracy.

Moreover, the interference eliminating device of the present invention permits elimination of a narrow-band, high-power-density interference carrier which suddenly gets mixed into the satellite circuit, and hence prevents degradation of the circuit quality of the digital satellite communication system, in particular, prevents system down of the TDMA system by the interference wave.

What we claim is:

1. An interference reducing device:
compromising a received signal path branched into first and second lines, said first line having an interference detector for detecting a narrow band interference carrier mixed in a digitally modulated signal from the received signal path;
said second line being branched into third and fourth lines, said third line having first and second mixers and a narrow-band elimination filter and a band-pass filter both connected in cascade between an output of said first mixer and an input of said second mixer, said band-pass filter passing there through only desired frequency components of the digitally modulated signal;
a voltage-controlled oscillator having an oscillation frequency output controlled by the output of said interference detector and applied as local oscillator inputs of said first and second mixers to thereby control a center frequency for band elimination between the input and output of said third line;
said fourth line being branched into fifth and sixth lines, said fifth line having a plurality of narrow band-pass filters whose transmission losses are set to a fixed value and whose center frequencies are particular frequencies within the band of the received signal;
means provided for combining the output of said third line having said band elimination filter and the output of said fifth line having said narrow band-pass filters; and an output terminal coupled to the provided means and said sixth line.

2. An interference reducing device:
compromising a received signal path branched into first and second lines, said first line having an interference detector for detecting a narrow band interference carrier mixed in a digitally modulated signal from the received signal path;
said second line having first and second mixers and a narrow band-elimination filter and a band-pass filter both connected in cascade between an output of said first mixer and an input of said second mixer, said narrow-band elimination filter having its attenuation at its center frequency for band elimination set to a fixed value and said band-pass filter passing therethrough only desired frequency components of the digitally modulated signal;
a voltage-controlled oscillator whose oscillator frequency output is controlled by the output of said interference detector and applied as local oscillator inputs of said first and second mixers;
the center frequency for band elimination between said first and second mixers being controlled by the output frequency of said voltage-controlled oscillator and the attenuation of the interference carrier by said band-elimination filter being limited to a fixed value; and
an output terminal coupled to an output of said second mixer.

3. an interference reducing device according to claim 1 or 2, in which said interference detector comprises a phase-lock loop synchronized with an input interference carrier and the center frequency for band elimination is controlled by the output frequency of a voltage-controlled oscillator of said phase-lock loop.

4. An interference reducing circuit according to claim 1 or 2, in which said interference detector is a multiplexer composed of a plurality of narrow band-pass filters of different center frequencies and a circuit for detecting and converting each output of said multiplexer into a digital voltage value, and an input signal band is divided by said multiplexer and a detected voltage value of each divided signal band is processed to thereby detect the interference carrier and control the oscillation frequency of said voltage-controlled oscillator.

5. An interference eliminating device: comprising a received signal path branched into first and second lines, said first line having an interference detector for detecting a narrow-band interference carrier wave mixed in a digitally modulated signal from the received signal path;

said second line being branched into third and fourth lines, said third line having first and second mixers and a narrow-band elimination filter and a band-pass filter both connected in cascade between an output of said first mixer and an input of said second mixer, said band-pass filter passing therethrough only desired frequency components of the digitally modulated signal;

a voltage controlled oscillator, whose oscillation frequency is controlled by the output of said interference detector provided as a local oscillator of each of said first and second mixers;

a narrow-band interference eliminator connected in the voltage-controlled oscillator so that its center frequency for band elimination is controlled by the oscillator frequency of said voltage-controlled oscillator; and a switch switchable between said third and fourth lines under control by an output of the interference detector of said first line.

6. An interference eliminating device according to claim 5, in which said interference detector comprises a phase-lock loop synchronized with an input interference carrier, and the center frequency for band elimination is controlled by the output frequency of a voltage-controlled oscillator of said phase-lock loop.

7. An interference eliminating device according to claim 5, in which said interference detector comprises a multiplexer employing a plurality of narrow band-pass filters of different center frequencies and a circuit for detecting and converting each output of said multiplexer into a corresponding digital voltage value; and means is provided for dividing an input signal band of the received signal path by said multiplexer and for processing a detected voltage value of each divided band to thereby detect the narrow-band interference carrier and control the oscillation frequency of said voltage-controlled oscillator.

8. An interference reducing device comprising:
input terminal means for receiving a digital modulated signal;
a voltage-controlled oscillator for generating an oscillation frequency output;
a first mixer for mixing said digital modulated signal with said oscillation frequency output;
a multiplexer for dividing the output of first mixer into plurality of signal frequency band parts;
A/D converters for converting each signal of said divided signals of the output of the multiplexer into a digital voltage output;
a CPU for processing said converted voltage output to effect a decision as to the presence or absence, the frequency and the frequency change direction of a narrow-band interference carrier included in said digital modulated signal in accordance with said frequency band parts;
a D/A converter for converting the output of said CPU to an analog output to control said oscillation frequency output of said voltage-controlled oscillator with the CPU output;
a second mixer for mixing said digital modulated signal with said oscillation frequency output;
a band-elimination filter for eliminating said narrow-band interference carrier from the output of said second mixer;
a first band-pass filter for passing desired frequency components from the output of said second mixer;
a third mixer for mixing the output of said first-band pass filter with said oscillation frequency output;
a second band-pass filter for passing desired frequency components from the output of said third mixer;
a bypass transmission line coupled to said input terminal means for bypassing said digital modulated signal around a cascade-connection compromising said second mixer, said band-elimination filter, said first-band pass filter, said third mixer and said second band-pass filter;
output terminal means; and
a switch responsive to the output of the CPU for switching the output of said second band-pass filter or said digital modulated signal obtained from said bypass transmission line to said output terminal means in dependence upon said CPU output, so that upon detection of the interference carrier included in said digital modulated signal, said switch selects the output of said second band-pass filter.

9. An interference reducing device according to claim 8, further comprising:
a second voltage-controlled oscillator for generating a second oscillation frequency output;
a fourth mixer for mixing said digital modulated signal with said second oscillation frequency output;
a second multiplexer for dividing the output of said fourth mixer into a plurality of second signal frequency band parts;
second A/D converters for converting each signal of the second divided signals output of the second multiplexer into a second corresponding digital voltage output applied to said CPU; and
a second D/A converter for converting the output of said CPU to an analog output to control said second oscillation frequency output of said second-voltage-controlled oscillator with the CPU output, and
said CPU processing said converted voltage output and said second corresponding digital voltage output effecting said decision.

10. An interference reducing device according to claim 8, further comprising:
a fourth mixer for mixing said digital modulated signal with said oscillation frequency output;
a second multiplexer for dividing the output of said fourth mixer into a plurality of second signal frequency band parts; and
second A/D converters for converting each signal of said second divided signals into a second corresponding digital voltage output applied to said CPU, and said CPU processing said converted voltage output and further said second corresponding digital voltage output in effecting said decision.

11. An interference detector for an interference reducing device, comprising:

input means for receiving a digitally modulated signal;

a voltage-controlled oscillator for generating an oscillation frequency output;

a mixer for mixing the digital modulated signal with said oscillator frequency output;

a multiplexer for dividing the output of said mixer into a plurality of signal frequency band parts;

A/D converters for converting said signal of said divided signals into a digital voltage output;

a CPU for detecting, by the use of said converted voltage output a narrow-band interference carrier included in said signal frequency band parts; and a D/A converter for converting the output of said CPU to an analog output to control said oscillation frequency output of said voltage-controlled oscillator with the CPU output.

* * * * *